US009172940B2

(12) United States Patent  
Maleki et al.

(10) Patent No.: US 9,172,940 B2  
(45) Date of Patent: Oct. 27, 2015

(54) TWO-DIMENSIONAL VIDEO TO THREE-DIMENSIONAL VIDEO CONVERSION BASED ON MOVEMENT BETWEEN VIDEO FRAMES

(71) Applicants: Behrooz A. Maleki, Tualatin, OR (US); Sarvenaz Sarkhosh, Tualatin, OR (US)

(72) Inventors: Behrooz A. Maleki, Tualatin, OR (US); Sarvenaz Sarkhosh, Tualatin, OR (US)

(73) Assignee: BITANIMATE, INC., Lake Oswego, OR (US)

( * ) Notice: Subject to any disclaimer, the term of this patent is extended or adjusted under 35 U.S.C. 154(b) by 107 days.

(21) Appl. No.: 13/859,666

(22) Filed: Apr. 9, 2013

(65) Prior Publication Data

US 2014/0104381 A1    Apr. 17, 2014

Related U.S. Application Data

(63) Continuation of application No. 13/476,965, filed on May 21, 2012, now abandoned, which is a continuation of application No. 12/486,680, filed on Jun. 17, 2009, now abandoned.

(60) Provisional application No. 61/206,853, filed on Feb. 5, 2009.

(51) Int. Cl.
*H04N 13/00* (2006.01)
*H04N 13/02* (2006.01)

(52) U.S. Cl.
CPC ....... *H04N 13/0029* (2013.01); *H04N 13/0264* (2013.01)

(58) Field of Classification Search
CPC .................................................. H04N 13/0029
USPC .......................................................... 348/43
See application file for complete search history.

(56) References Cited

U.S. PATENT DOCUMENTS 4,870,600 A * 9/1989 Hiraoka ........................ 345/419  
5,109,435 A 4/1992 Lo et al.  
(Continued)

FOREIGN PATENT DOCUMENTS

KR 10-2010-0127423 A 12/2010  
KR 10-2011-0120170 A 11/2011  
(Continued)

OTHER PUBLICATIONS

International Search Report dated Jan. 29, 2014 as received in Application No. PCT/US2013/035843.

(Continued)

*Primary Examiner* — Dave Czekaj  
*Assistant Examiner* — Leron Beck  
(74) *Attorney, Agent, or Firm* — Maschoff Brennan

(57) ABSTRACT

A method for converting two-dimensional video to three-dimensional video. The method includes the steps of comparing at least part of video frame x to a corresponding at least part of video frame y to determine movement therebetween, calculating a movement direction and movement extent based on the determined movement, determining viewing frame L and viewing frame R based on the movement direction, and modifying viewing frame R based on the movement direction and the movement extent to create modified viewing frame R'. One alternative embodiment is a video display device for converting two-dimensional video to three-dimensional video. Another alternative embodiment includes one or more device-readable media storing executable instructions that, when executed, configure a video display device to convert two-dimensional video to three-dimensional video.

19 Claims, 8 Drawing Sheets

(56) References Cited

U.S. PATENT DOCUMENTS

| | | | |
|---|---|---|---|
| 5,406,501 A | | 4/1995 | Florent |
| 5,576,767 A | * | 11/1996 | Lee et al. ................. 375/240.14 |
| 5,682,437 A | | 10/1997 | Okino et al. |
| 5,717,415 A | * | 2/1998 | Iue et al. ............................ 345/8 |
| 5,748,199 A | | 5/1998 | Palm |
| 5,777,666 A | | 7/1998 | Tanase et al. |
| 6,011,580 A | * | 1/2000 | Hattori et al. .................... 348/57 |
| 6,108,041 A | * | 8/2000 | Faroudja et al. ............... 348/446 |
| 6,445,833 B1 | | 9/2002 | Murata et al. |
| 6,466,205 B2 | | 10/2002 | Simpson et al. |
| 6,477,267 B1 | | 11/2002 | Richards |
| 6,515,659 B1 | | 2/2003 | Kaye et al. |
| 6,516,099 B1 | * | 2/2003 | Davison et al. ............... 382/284 |
| 6,553,184 B1 | | 4/2003 | Ando et al. |
| 6,584,219 B1 | | 6/2003 | Yamashita et al. |
| 7,102,633 B2 | | 9/2006 | Kaye et al. |
| 7,116,323 B2 | | 10/2006 | Kaye et al. |
| 7,116,324 B2 | | 10/2006 | Kaye et al. |
| 7,148,913 B2 | * | 12/2006 | Keaton et al. .................. 348/169 |
| 7,161,614 B1 | * | 1/2007 | Yamashita et al. ............... 348/42 |
| 7,180,536 B2 | | 2/2007 | Wolowelsky et al. |
| 7,224,357 B2 | | 5/2007 | Chen et al. |
| 7,321,374 B2 | | 1/2008 | Naske |
| 7,349,568 B2 | | 3/2008 | Takemoto et al. |
| 2002/0118275 A1 | | 8/2002 | Harman |
| 2002/0191841 A1 | | 12/2002 | Harman |
| 2005/0099414 A1 | | 5/2005 | Kaye et al. |
| 2005/0104879 A1 | | 5/2005 | Kaye et al. |
| 2005/0146521 A1 | | 7/2005 | Kaye et al. |
| 2005/0231505 A1 | | 10/2005 | Kaye et al. |
| 2006/0139751 A1 | * | 6/2006 | Cha et al. ....................... 359/465 |
| 2007/0146380 A1 | | 6/2007 | Nystad et al. |
| 2007/0206678 A1 | * | 9/2007 | Kondo .................. G06T 3/4053 375/240.17 |
| 2007/0217685 A1 | | 9/2007 | Kaneko et al. |
| 2007/0279412 A1 | | 12/2007 | Davidson et al. |
| 2008/0085049 A1 | | 4/2008 | Naske et al. |
| 2008/0226181 A1 | | 9/2008 | Birtwistel et al. |
| 2008/0226194 A1 | | 9/2008 | Birtwistel et al. |
| 2008/0228449 A1 | | 9/2008 | Birtwistel et al. |
| 2008/0258997 A1 | * | 10/2008 | Arai .................................. 345/6 |
| 2009/0003728 A1 | | 1/2009 | Ernst et al. |
| 2009/0028425 A1 | | 1/2009 | Cavallaro et al. |
| 2010/0283797 A1 | * | 11/2010 | Hoshino ....................... 345/629 |
| 2012/0002279 A1 | | 1/2012 | Jain |

FOREIGN PATENT DOCUMENTS

| | | |
|---|---|---|
| KR | 10-2013-0010613 A | 1/2013 |
| WO | 99/12127 A1 | 3/1999 |

OTHER PUBLICATIONS

Written Opinion of the International Searching Authority dated Jan. 29, 2014 as received in Application No. PCT/US2013/035843.

ChromaDepth Primer, at least as early as May 14, 2009, p. 1-4, American Pater Optice. Inc., http://www.chromatek.com/ChromaDepth_Primer/chromadepth_primer.html.

Navigate in 3D Through Ordinary Video, at least as early as May 14, 2009, The Motion Parallax Company, http://www.motionparallax.com/.

Automatic Single-Camera Navigable Video, at least as early as May 14, 2009; p. 1-2, The Motion Parallax Company, http://www.motionparallax.com/setupscreen.htm.

2D-3D Video Player, at least as ealry as May 14, 2009, p. 1, 2D-3D Video Inc., http://www.2d-3dvideo.com/.

2D-3D Remeastering, at least as early as May 14, 2009, p. 1, 2D-3D Video Inc., http://www.2d-3dvideo.com/.

Interview with Craig Summers from 2D-3D Video, 3rd Dimension, Oct. 2008, p. 71-77, Vertas et Visus, http://www.2d-3dvideo.com/NewSite/3rdDimensionInterview.pdf.

* cited by examiner

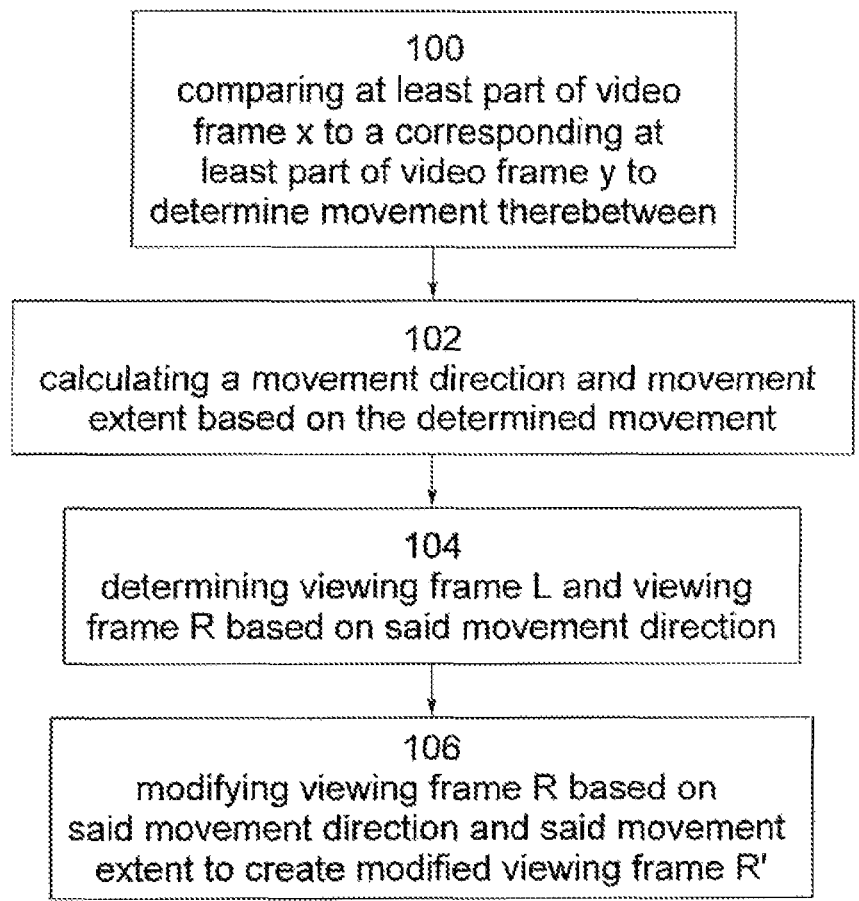
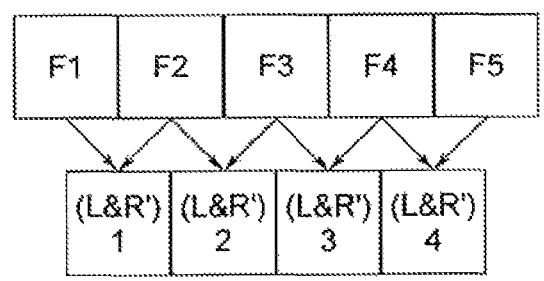

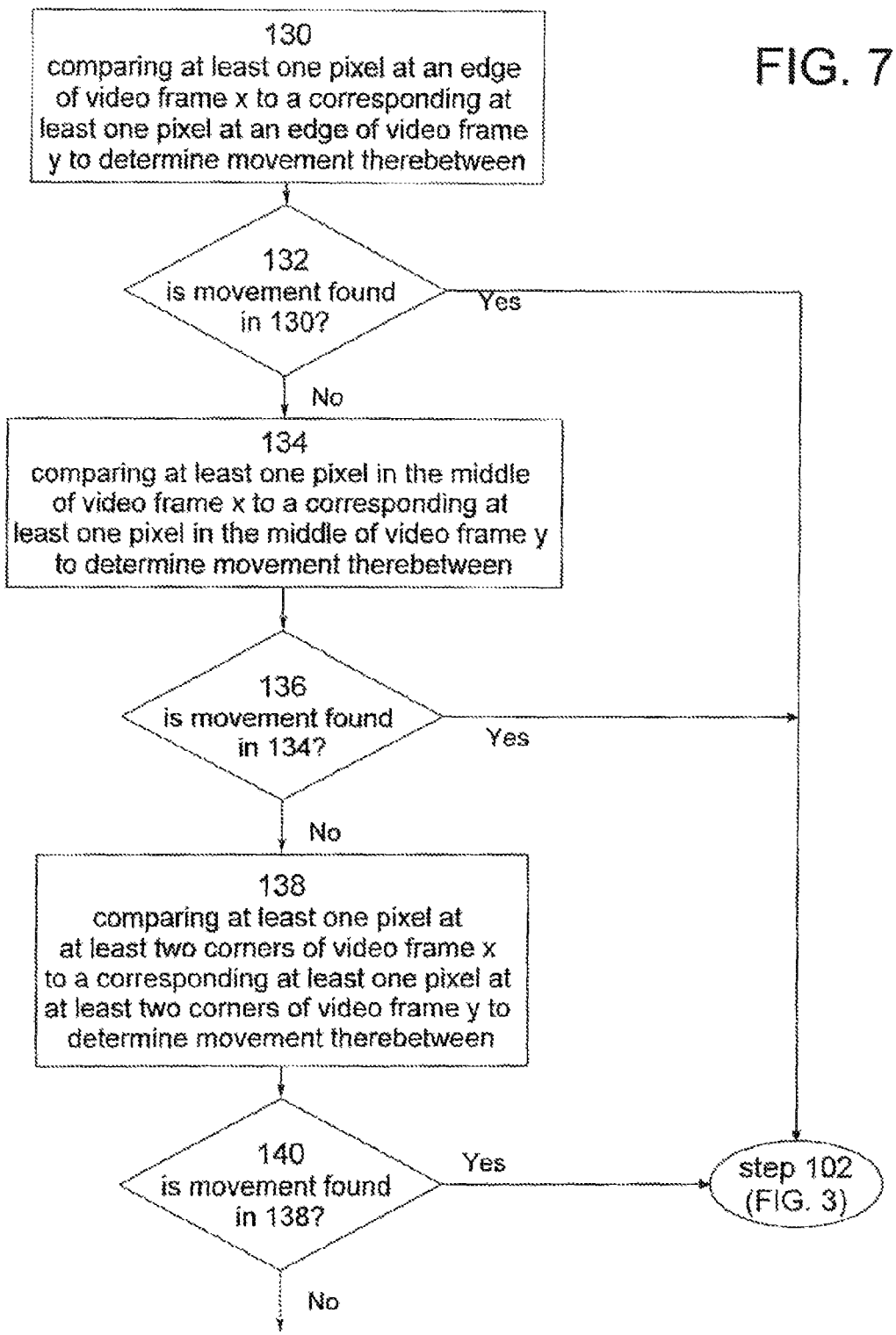

TWO-DIMENSIONAL VIDEO TO THREE-DIMENSIONAL VIDEO CONVERSION BASED ON MOVEMENT BETWEEN VIDEO FRAMES

This patent application is a continuation of U.S. patent application Ser. No. 13/476,965, filed May 21, 2012, which is a continuation of U.S. patent application Ser. No. 12/468,680, filed Jun. 17, 2009, which claims the benefit under of U.S. Provisional Patent Application 61/206,853, filed Feb. 5, 2009. The foregoing patent applications are incorporated herein by reference.

BACKGROUND OF INVENTION

The present invention is directed to a method and system for converting two-dimensional (monoscopic) video to three-dimensional '(stereoscopic) video, and, more specifically, to a method and system for converting two-dimensional (monoscopic) video to three-dimensional (stereoscopic) video in real time.

Humans have a binocular vision system that uses two eyes spaced approximately two and a half inches (approximately 6.5 centimeters) apart. Each eye sees the world from a slightly different perspective. The brain uses the difference in these perspectives to calculate or gauge distance. This binocular vision system is responsible for the ability to determine with relatively good accuracy the distance of an object up to approximately twenty feet away. The relative distance of multiple objects in a field of view can also be determined. Using only one eye would significantly decrease the accuracy of this distance determination.

Traditional three-dimensional movies or videos (herein after referred to generically as "videos") are made using two video sources (e.g. cameras) that are mounted side-by-side, about three (e.g. at the same distance as the separation of human eyes) to eight inches apart. This distance is often referred to as the interaxial or interoccular distance. The two video sources actually create two videos; one for the left eye and one for the right eye. Each video is made up of a series of "frames" (referred to as "frames" or "video frames").

Traditionally, projection or display of a three-dimensional video has been accomplished by projecting or displaying a plurality of videos using, for example, a color differentiation system or a polarization system. This can be done using a plurality of projection or display devices (e.g. projectors) that each display one of the videos. This has also been done using single projection or display devices (e.g. the digital or analog display system of a computer, BETAMAX® player, VCR, DVD player, blue-ray player, television) that display the videos in an overlapping or interleaving fashion. The human binocular vision system is able to correlate these overlapping displays automatically because each eye sees only one of the overlapping or interleaving displays.

FIG. 1 shows an exemplary traditional color differentiation system 20 for projecting or displaying three-dimensional video 22 that uses color for differentiation. The first video source 24 projects through a first color filter (e.g. red) and a second video source 26 projects through a second color filter (e.g. blue). The video 22 in this figure is shown with an exaggerated double image. Viewers wear special glasses 28 with corresponding colored lenses 30, 32. For example, the first lens 30 would be a color that is the same color as one of the color filters (e.g. blue—shown as horizontal lines parallel to the bottom of the drawing page) and the second lens 32 would be a color that is the same color as the other color filter (e.g. red—shown as lines vertical lines parallel to the side of the drawing page). The screen display would have both colors (shown as arrows projecting from the screen). The eye covered by the first lens 30 would view the picture projected or displayed by the video source 24 projecting or displaying the opposite color. The eye covered by the second lens 32 would view the picture projected or displayed by the video source 26 projecting or displaying the opposite color. ChromaDepth® produces glasses (using micro prisms with similar two-color technology) that work on the same basic principle.

FIG. 2 shows an exemplary polarization differentiation system 40 for projecting or displaying three-dimensional video 42 that uses polarization for differentiation. The video 42 in this figure is shown with an exaggerated double image. This system takes advantage of the fact that polarized light will pass through polarized glass only if they are both polarized in the same direction. Accordingly, the first video source 44 projects through a first polarized filter (e.g. horizontal) and a second video source 46 projects through a second polarized filter (e.g. vertical). Viewers wear special glasses 48 with corresponding polarized lenses 50, 52. For example, the first lens 50 would have the same polarization as one of the polarized filters (e.g. shown as vertical dashed lines) and the second lens 52 would have the same polarization as the other polarized filter (e.g. shown as horizontal dashed lines). In this example, the eye covered by the first lens 50 would view the picture projected or displayed by the video source 44 projecting the horizontally polarized picture and the eye covered by the second lens 52 would view the picture projected or displayed by the video source 46 projecting the vertically polarized picture.

Another technology that is used for showing three-dimensional movies uses LCD shutter glasses. LCD shutter glasses have lenses that use liquid crystals and a polarizing filter that is transparent until a voltage is applied, at which time they become dark. An IR emitter sends an IR signal to trigger the voltage so that the lenses switch between transparent and dark in an alternating fashion, first one eye and then the other. This transparent/dark alternating is synchronized with the refresh rate of a specialized display screen that alternates between the display of a first perspective for a first eye and a second display for the second eye using a technique called alternate-frame sequencing. Used together, the LCD shutter glasses and the specialized display screen create the illusion of a three-dimensional picture (or at least three-dimensional elements of a picture).

Three-dimensional movies have been around for a long time. But after their heyday in the 1950s, three-dimensional movies as a medium fell into decline and movie producers turned their attention to other technologies. But new technologies (including polarization differentiation systems) have made this medium more attractive and new movies are being made and released as three-dimensional movies. A primary reason for this is that there has been a significant improvement in the quality of three-dimensional movies. Another reason that three-dimensional movies are becoming popular is that the movie viewing public appears willing to pay a premium for this special effect.

Even if movie producers are willing to invest in new technologies for producing new three-dimensional movies, it is significantly more expensive to film a movie using three-dimensional technology as compared to using two-dimensional technology. In addition, there are millions of two-dimensional movies that have already been produced. So there is a need to find a system or method for converting two-dimensional movies to three-dimensional movies.

Seeing this need, inventors have been trying to create methods and 3D systems for converting two-dimensional movies to three-dimensional movies. For example, there are many patents directed to methods and systems for converting two-dimensional movies for three-dimensional viewing. Many of these patents describe some type of analysis to "identify," "cut out," and/or "shift" one or more elements or objects in a scene and then layer the elements or objects to create the illusion of depth. Patents that fall into this category include, but are not limited to U.S. Pat. No. 6,477,267 to Richards and U.S. Pat. No. 7,321,374 to Naske. These prior art methods to convert two-dimensional movies for three-dimensional (stereoscopic) viewing, however, do not work at all (i.e. in theory they might work, but in practice they cannot work because currently available computer technology is not powerful enough to implement these computationally intensive methods), are resource intensive, and/or do not produce acceptable results (e.g. a cardboard cut-out effect). For example, some prior art methods are so computationally intensive that current processors are not powerful enough to handle the computations for more than a few elements or objects in each given scene.

BRIEF SUMMARY OF THE INVENTION

One preferred embodiment of the present invention is directed to a method for converting two-dimensional video to three-dimensional video. The method includes the steps of comparing at least part of video frame x to a corresponding at least part of video frame y to determine movement therebetween, calculating a movement direction and movement extent based on the determined movement, determining viewing frame L and viewing frame R based on the movement direction, and modifying viewing frame R based on the movement direction and the movement extent to create modified viewing frame R'.

In preferred embodiments, the step of comparing further includes comparing a predetermined number of pixels of video frame x to a corresponding predetermined number of pixels of video frame y to determine movement therebetween. In alternative preferred embodiments, the step of comparing further includes the step of comparing at least one pixel at an edge of video frame x to a corresponding at least one pixel at an edge of video frame y, the step of comparing at least one pixel in the middle of video frame x to a corresponding at least one pixel in the middle of video frame y, and/or the step of comparing at least one pixel at at least two corners of video frame x to a corresponding at least one pixel at at least two corners of video frame y to determine movement therebetween.

In preferred embodiments, the step of determining viewing frame L and viewing frame R based on the movement direction further includes the steps of (1) setting video frame x to be viewing frame L and setting video frame y to be viewing frame R if movement direction is rightward and (2) setting video frame x to be viewing frame R and setting video frame y to be viewing frame L if movement direction is leftward.

In preferred embodiments, the step of modifying viewing frame R further includes the step of digitally distorting viewing frame R to create modified viewing frame R'. The digital distortion may be digitally distorting viewing frame R into a stretched trapezoid to create modified viewing frame R'. The digital distortion may be digitally distorting viewing frame R into a stretched trapezoid with edges beyond the original frame size cropped off to create modified viewing frame R'.

The present invention may also be directed to a video display device for converting two-dimensional video to three-dimensional video.

The present invention may also be directed to one or more device-readable media storing executable instructions that, when executed, configure a video display device to convert two-dimensional video to three-dimensional video.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary embodiments.

FIG. 3 is a flowchart showing an exemplary preferred embodiment of a 10 method or system for converting two-dimensional video to three-dimensional video.

FIG. 4 is a simplified block diagram of an exemplary preferred embodiment of a system that combines pairs of consecutive video frames to create viewing frames using an exemplary preferred embodiment of a color differentiation system.

FIG. 7 is a flow chart of an exemplary preferred embodiment of how 25 various areas are checked in succession, one after another.

Figures 12, 13, 14:
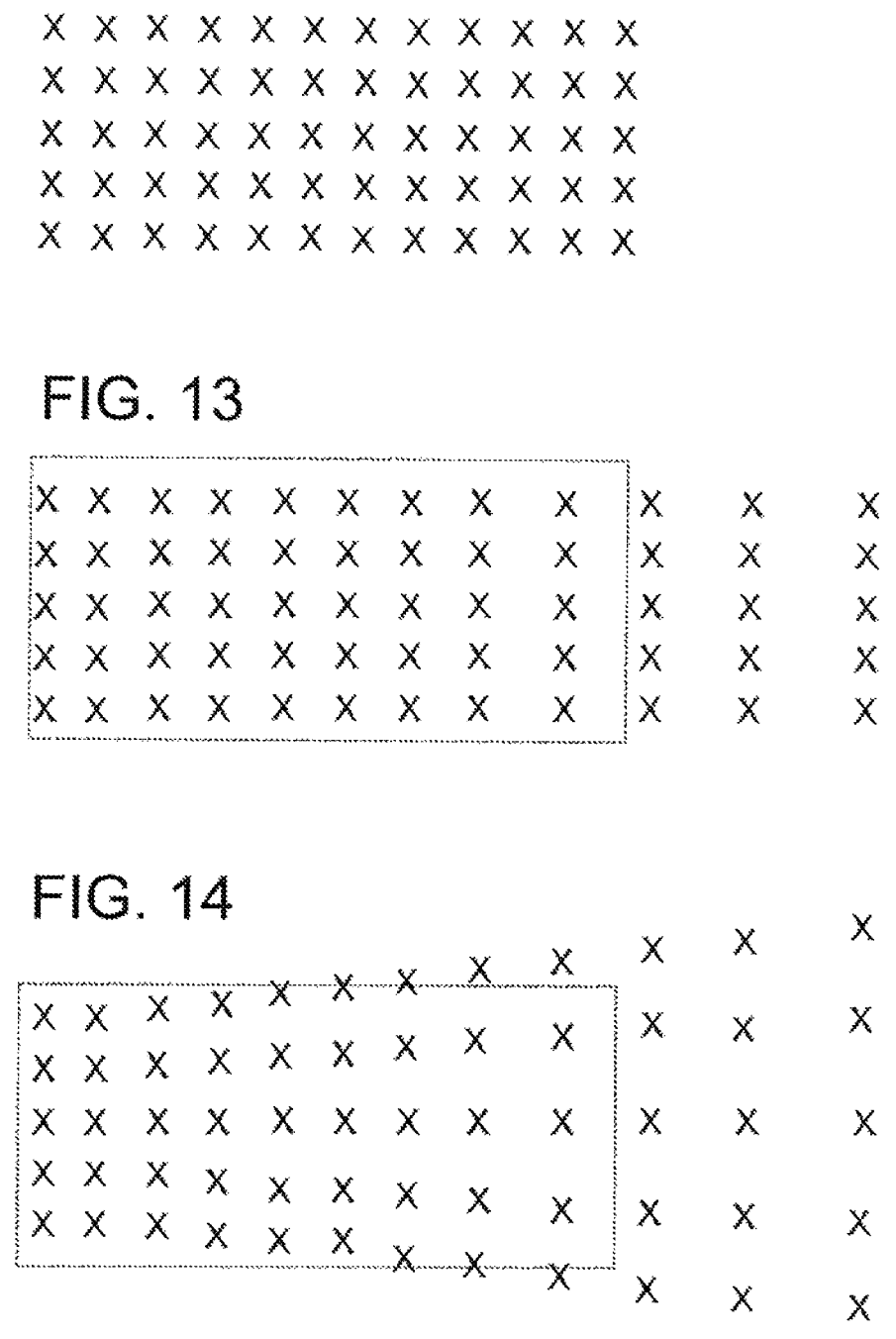

FIG. 12 is a simplified screen view of an array of the evenly spaced. 10 components (X) of viewing frame R in its original form.

FIG. 13 is a simplified screen view of an array of the components (X) of viewing frame R after elongating stretching distortion.

FIG. 14 is a simplified screen view of an array of the components (X) of viewing frame R after trapezoidal stretching distortion.

DETAILED DESCRIPTION OF THE INVENTION

Figure 1:
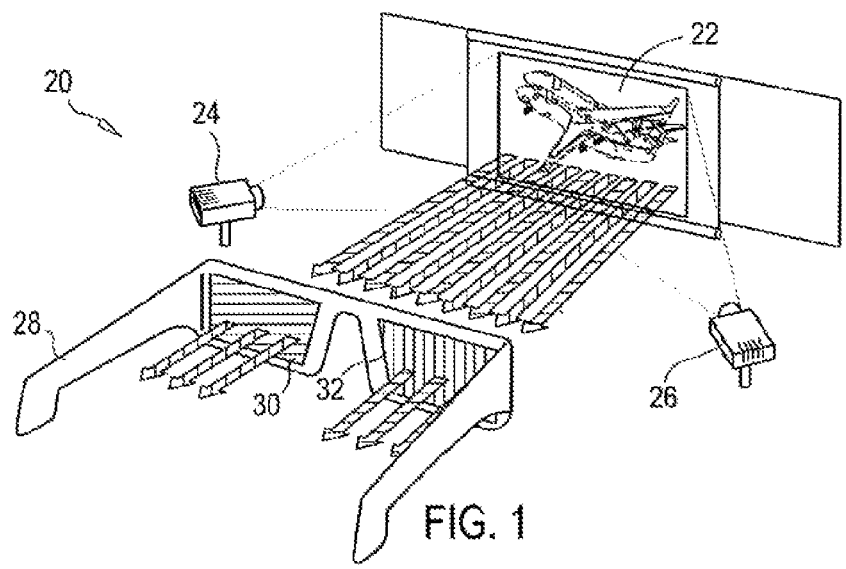
FIG. 1 is a simplified perspective view of an exemplary traditional color differentiation system.

The present invention is directed to a method and system for converting two-dimensional (monoscopic) video to three-dimensional (stereoscopic) video. This invention uses minimal computational resources so that the conversion can occur in real time. As compared to prior art that uses resource-expensive analysis or identification of elements or objects in a scene, uses resource-expensive processes to cut out the identified elements or objects, and then uses resource-expensive processes to shift only those elements or objects (sometimes having to fill in blank spaces), the present invention greatly conserves resources. This makes it possible for the present invention to converting two-dimensional video to three-dimensional video in real time.

It is to be understood that the inventions, examples, and embodiments described herein are not limited to particularly exemplified materials, methods, and/or structures. Further, all publications, patents, and patent applications cited herein, whether supra or infra, are hereby incorporated by reference in their 'entirety.

Before describing the invention and the figures, some of the terminology should be clarified.

As set forth above, the term "video" is used to describe movies or videos that are made up of a series of "frames" (referred to as "frames" or as "video frames"). For purposes of clarity, consecutive video frames will be referred to as video frame x and video frame y. These terms are meant to be relational and, therefore, video frame y would become video frame x to the frame that followed it. As will be discussed, the video frame that is displayed to the left eye will be referred to as viewing frame L and the video frame that is displayed to the right eye will be referred to as viewing frame R. It should be noted, however, that one or both of viewing frame L and viewing frame R may be modified. If it is a modified version that is displayed, the displayed viewing frame will be described as a "modified viewing frame."

Each video frame and/or viewing frame displays a "picture" that includes elements or objects (referred to generally as "elements"). For example, in a "picture" of a sky, the "element" of a plane may fly across the screen. Elements may be moving elements or stationary elements. In digital imaging, the term "pixel" is generally used to describe the smallest item of information in an image. Pixels are normally arranged in a two-dimensional grid. The term "pixel" is used in the present invention primarily in the form of pixels on a display device that are used to display the picture or the elements therein. It may also be used to describe the digital data of the original video frames x and y. Pixels (P) are shown and discussed, for example, in relation to FIGS. 6, 10, and 11. For purposes of understanding this invention, the picture may also be described as being comprised of an array of components (X) that represent small parts of the picture arranged in an array. In digital media, the components (X) may be, for example, electronic data and/or pixels. In analog media (e.g. film and video tape), the components (X) may be the actual celluloid. Components (X) are shown and discussed, for example, in relation to FIGS. 12-14. Although in some circumstances they may be the interchangeable, for purposes of the present invention what distinguishes components (X) from pixels (P) is that the components (X) can be displaced in the process of distortion. This might be understood better by looking at FIG. 12 and FIG. 14. In FIG. 12, the upper right hand corner component (X) might be the same as the upper right hand corner pixel (P) (not shown), but after the frame has been distorted as shown in FIG. 14, the upper right hand corner component (X) would be out of the frame and would not be the same as the upper right hand corner pixel (P) (not shown) which would remain in the same position as it was in FIG. 12.

It should be noted that the present invention may be implemented using different types of technology including but not limited to video display systems (e.g. VCRs, movie projectors, televisions, and other projection or display devices), computers (e.g. workstations, handheld technical devices or other programmable apparatuses), dedicated or general purpose devices capable of projecting or displaying video, or virtually any current or future technology means capable of projecting or displaying video, all of which are referred to in this specification as "video display devices." Video display devices may be made up of one or more processing units. A video display device may also be a combination of devices such as a television and an attached "box" that together function as a video display device of the present invention. Also, a video display device of the present invention may be implemented in two temporally and/or physically distinct stages, for example having a recording stage (e.g. burning or recording a CD, DVD, or tape) and a playback stage (e.g. playing the CD, DVD, or tape). The video display devices may be built specifically for the present invention and/or may be programmed or otherwise adapted for use with the present invention.

It should be noted that a method of the present invention may be encoded and/or stored on a medium capable of being "read" by a video display device or a device working in conjunction with a video display device. This medium includes, but not limited to memory media (e.g. RAM, PROM, EPROM, or FLASH-EPROM), magnetic media (e.g. floppy disks, flexible disks, hard disks, or magnetic tapes), optical media (e.g. CDROMs and DVDs), physical media (e.g. punched cards or paper tapes), or virtually any current or future memory and/or storage means, all of which are referred to in this specification as "memory," "memory means," and/or "device-readable media." The memory may be volatile and/or non-volatile. The memory may be integral with and/or distinct from the video display device. As an example, if the video display device was a computer, the memory could be computer-readable media having computer-executable instructions thereon that, when executed, direct the video display device to convert two-dimensional video to three-dimensional video in accordance with the present invention.

It should be noted that the present invention may be implemented as a method for converting two-dimensional video to three-dimensional video. It should be noted that the present invention may be implemented as a system for converting two-dimensional video to three-dimensional video. It should be noted that a "system" may be a video display device and/or one or more device-readable media storing executable instructions that, when executed, configure a video display device to convert two-dimensional video to three-dimensional video.

Please note that the terms and phrases may have additional definitions and/or examples throughout the specification. Where otherwise not specifically defined, words, phrases, and acronyms are given their ordinary meaning in the art. Exemplary embodiments may be better understood with reference to the drawings, but these embodiments are not intended to be of a limiting nature. The same reference numbers will be used throughout the drawings and description in this document to refer to the same or like parts. Finally, as used in this specification and the appended claims, the singular forms "a," "an" and "the" include plural referents unless the content clearly dictates otherwise.

FIGS. 3 and 7 are flow charts illustrating methods and systems. Even if described only in terms of steps in a method, it will be understood that each block of these flow charts, and combinations of blocks in these flow charts, may be implemented by software (e.g. program instructions, software programs, and subprograms), by hardware (e.g. processors and memory), by firmware, and/or a combination of these forms. As an example, in the case of software, program instructions may be loaded onto a video display device (or the memory of the video display device) to produce a machine, such that the instructions that execute on the video display device create structures for implementing the functions specified in the flow chart block or blocks. These program instructions may also be stored in a memory that can direct a video display device to function in a particular manner, such that the instructions stored in the memory produce an article of manufacture including instruction structures that implement the function specified in the flow chart block or blocks. The program instructions may also be loaded onto a video display device to cause a series of operational steps to be performed on or by the video display device to produce a video display device implemented process such that the instructions that execute on the video display device provide steps for implementing the functions specified in the flow chart block or blocks. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention.

Figure 2:
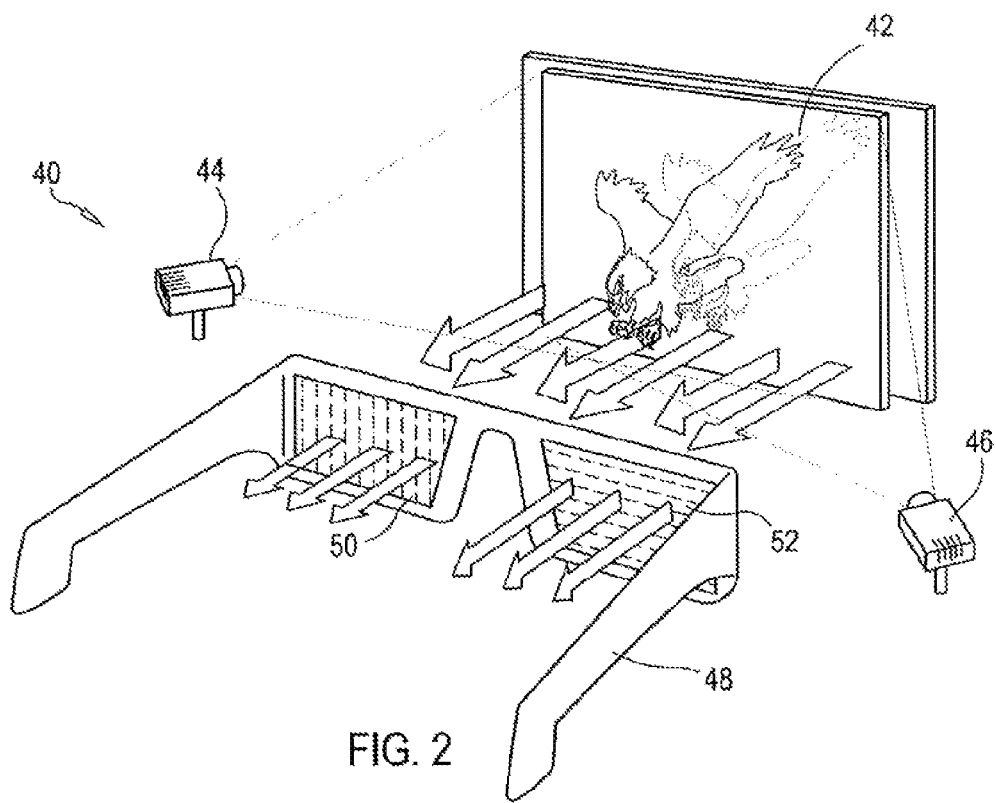
FIG. 2 is a simplified perspective view of an exemplary traditional polarization differentiation system.

As a preliminary matter, it should be emphasized that the present invention begins with a single two-dimensional video. The prior art discussed in connection with FIGS. 1 and 2 begins with two two-dimensional videos, each made from a separate one of two video sources.

FIG. 3 is a flowchart showing a method for converting two-dimensional video to three-dimensional video, which includes four basic steps. The first step, as shown in step 100, is comparing at least part of video frame x to a corresponding at least part of video frame y to determine movement therebetween. The second step, as shown in step 102, is calculating a movement direction and movement extent based on the determined movement. The third step, as shown in step 104, is determining viewing frame L and viewing frame R based on the movement direction. The fourth step, as shown in step 106, is modifying viewing frame R based on the movement direction and the movement extent to create modified viewing frame R'. These steps will be described in more detail herein. These steps (steps 100, 102, 104, and 106) may be repeated for multiple consecutive frames. As mentioned above, as is the case with all the flowcharts in this specification, the method may be implemented not only by software, but as a system that uses hardware, firmware, and/or a combination of hardware, firmware, and/or software.

Figure 5:
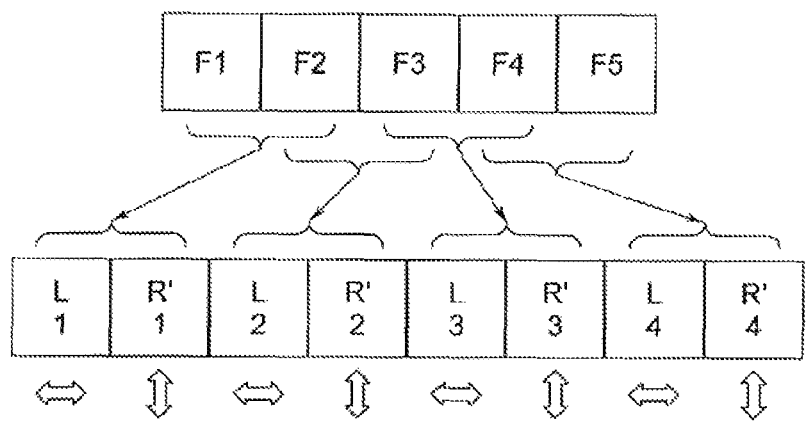
FIG. 5 is a simplified block diagram of an exemplary preferred embodiment of a system that combines pairs of consecutive video frames to create' viewing frames using an exemplary preferred embodiment of a polarization differentiation system.

FIGS. 4 and 5 are simplified block diagrams that may be used to explain two exemplary embodiments of the present invention. FIG. 4 might be used in an exemplary preferred embodiment using a color differentiation system and FIG. 5 might be used in an exemplary preferred embodiment using an exemplary polarization differentiation system that takes advantage of modern systems that can display more frames per second than prior systems. For example, traditional systems only display 24 frames per second, but more modern (and future) systems can display 60, 120, 144, or more frames per second. In the top row of boxes in both of these figures, F1-F5 are used to represent consecutive frames in a video. Two consecutive frames would be designated as video frame x (the first) and video frame y (the second). The bottom row of boxes in FIG. 4 represents the simultaneously displayed viewing frame L and modified viewing frame R'. It should be noted that both the viewing frame L and the modified viewing frame R' may be modified (viewing frame L) or further modified (modified viewing frame R') so that they are viewable only by a respective eye (e.g. they may have colored filters applied to them). It should be noted that this modification or further modification may occur before or after the distortion modification of modified viewing frame R'. The bottom row of boxes in FIG. 5 represents the interleavingly displayed viewing frame L and modified viewing frame R'. It should be noted that both the viewing frame L and the modified viewing frame R' may be modified (viewing frame L) or further modified (modified viewing frame R') so that they are viewable only by a respective eye (e.g. as shown by the directional arrows below the bottom row of boxes, the frames may be displayed in alternating polarities). It should be noted that this modification or further modification may occur before or after the distortion modification of modified viewing frame R'.

Step 100 in FIG. 3 is to compare at least part of video frame x to a corresponding at least part of video frame y to determine movement therebetween. Since preferred embodiments of the present invention only compare part of video frame x to a corresponding part of video frame y, computational resources are conserved. As compared to traditional comparison schemes that compare all the pixels in a first frame to all the pixels in a second frame, the present invention only uses significantly less than 1% of the computational resources used by a system that compares all of video frame x to all of video frame y."

Figure 6:
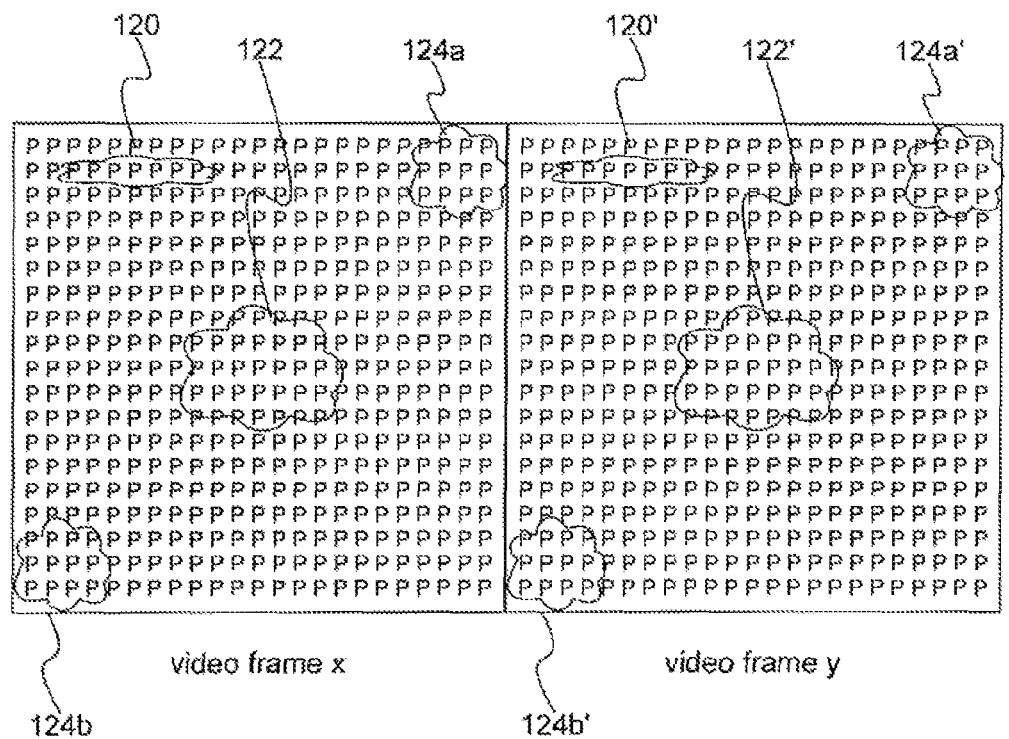
FIG. 6 is a simplified view of a set of exemplary video frames x and y each having an array of pixels (P) and graphic indications of an exemplary edge area, an exemplary middle area, and two exemplary corners in video frame x and with a corresponding exemplary edge area, a corresponding exemplary middle area, and two corresponding exemplary corners in video frame y.

FIG. 6 shows a simplified set of video frames x and y with exaggerated pixels (P). One exemplary screen might have a 1920×1080 array of pixels (P). It should be noted, however, that the present invention will work with any size array of pixels (P). In alternative preferred embodiments, step 100 might be accomplished using pseudo-pattern recognition to determine movement of pixels (P) therebetween. Although almost any pattern recognition or pseudo-pattern recognition scheme could be used for this purpose, for the purpose of providing examples and/or enablement, exemplary schemes that could be used for this purpose are disclosed in U.S. Patent Publication No. 20070217685 to Kaneko et al., U.S. Patent Publication No. 20070146380 to Nystad et al., U.S. Patent Publication No. 20090028425 to Cavallaro et al., U.S. Pat. No. 5,406,501 to Florent, and U.S. Pat. No. 5,109,435 to Lo et al. These references are herein incorporated by reference. In other alternative preferred embodiments, step 100 might be accomplished by comparing a predetermined number of pixels (P) of video frame x to a corresponding predetermined number of pixels (P) of video frame y to determine movement therebetween. As an example, the predetermined number of pixels (P) might be between 5 and 30 pixels (P) for the exemplary display having a 1920×1080 array of pixels (P). It should be noted that the predetermined number of pixels (P) may be a simple preset number, a number determined based on characteristics of the screen (e.g. size and/or number of pixels), or a calculated number based on, for example, the number of frames per second, the dimensions of the screen, and/or the number of pixels on the screen. It should be noted that in preferred embodiments of the present invention, the predetermined number of pixels (P) will be less than 10% of the total number of pixels of the screen. It should be noted that in alternative preferred embodiments of the present invention, the predetermined number of pixels (P) will be less than 1% of the total number of pixels of the screen.

In other alternative preferred embodiments, step 100 might be accomplished by comparing at least one pixel (P) at an edge of video frame x to a corresponding at least one pixel (P) at an edge of video frame y to determine movement therebetween, by comparing at least one pixel (P) in the middle of video frame x to a corresponding at least one pixel (P) in the middle of video frame y to determine movement therebetween, and/or by comparing at least one pixel (P) at at least two corners of video frame x to a corresponding at least one pixel (P) at at least two corners of video frame y to determine movement therebetween. FIG. 6 shows video frame x with an exemplary edge area 120, an exemplary middle area 122, and two exemplary corners 124a, 124b and video frame y with a corresponding exemplary edge area 120', a corresponding exemplary middle area 122', and two corresponding exemplary corners 124a', 124b'. These exemplary areas are not meant to limit the scope of the invention.

As noted above, step 100 might be accomplished by comparing at least one pixel (P) at an edge of video frame x to a corresponding at least one pixel (P) at an edge of video frame y to determine movement therebetween, by comparing at least one pixel (P) in the middle of video frame x to a corresponding at least one pixel (P) in the middle of video frame y to determine movement therebetween, and/or by comparing at least one pixel (P) at at least two corners of video frame x to a corresponding at least one pixel (P) at at least two corners of video frame y to determine movement therebetween (the latter comparison meaning at least one pixel at at least one corner, and at least one pixel at at least a second corner—using the two corners would be particularly effective if the scene were zooming in, i.e. getting closer, or zooming out, i.e. getting further away). Any of these comparisons could be done individually or in any combination or order. Also, steps could be repeated using different dimensions and/or ranges (e.g. first comparing 5 pixels (P) at a given area, then comparing 10 pixels (P) at the same given area, and then comparing 20 pixels (P) at the same given area). In one preferred embodiment, however, the various areas are checked in succession, one after another, although it should be noted that the order can vary. FIG. 7 is a flow chart that shows an example of how this might work. As shown at 130, at least one pixel (P) at an edge of video frame x is compared to a corresponding at least one pixel (P) at an edge of video frame y to determine movement therebetween. Decision 132 asks whether movement has been found at 130. If it has, the analysis would be complete and the next step would be step 102 of FIG. 3 (calculating a movement direction and movement extent based on the determined movement). On the other hand, if no movement has been found, as shown at 134, at least one pixel (P) in the middle of video frame x would be compared to a corresponding at least one pixel (P) in the middle of video frame y to determine movement therebetween. Decision 136 asks whether movement has been found at 134. If it has, the analysis would be complete and the next step would be step 102 of FIG. 3 (calculating a movement direction and movement extent based on the determined movement). On the other hand, if no movement has been found, as shown at 138, at least one pixel (P) at at least two corners of video frame x would be compared to a corresponding at least one pixel (P) at at least two corners of video frame y to determine movement therebetween. Decision 140 asks whether movement has been found at 138. If it has, the analysis would be complete and the next step would be step 102 of FIG. 3 (calculating a movement direction and movement extent based on the determined movement). On the other hand, if no movement has been found there are several possible scenarios. In one preferred exemplary embodiment, other "areas" of video frame x and video frame y are compared. In another preferred exemplary embodiment, all the pixels (P) of video frame x and video frame y are compared. In yet another preferred exemplary embodiment, the analysis ends and video frame x and video frame y are displayed.

The order of the steps shown in FIG. 7 may vary. For example, the middle area may always be considered first. Further, the choice of which area is considered first may be "intelligent." For example, if motion is not found in step 130 (edge area), but is found in step 134 (middle area), the next set video frames might be compared using step 134 first. This option takes advantage of the fact that motion is likely to be similar in a series of frames. For example, if a movie scene has people moving in the center of the screen, then the series of frames will have motion in that area.

As mentioned above, FIGS. 4 and 5 show simplified block diagrams of a series of video frames and how consecutive video frames are combined to create viewing frames using a color differentiation system (FIG. 4) and a polarization differentiation system (FIG. 5). More detail on the steps (e.g. steps 102, 104, and 106 from FIG. 3) between the video frames x and y of a video and the viewing frames L and R', is shown in FIGS. 8A-8D and FIGS. 9A-9D. The most significant difference between FIGS. 8A-8D and FIGS. 9A-9D is that FIGS. 8A-8D show movement in a rightward (left to right) direction and FIGS. 9A-9D show movement in a leftward (right to left) direction. Accordingly, similar items will be described using the same reference numbers with only different modifiers ("a" for FIGS. 8A-8D and "b" for FIGS. 9A-9D). Reference numbers without modifiers apply to both sets of figures. It should be noted that some aspects of the invention are greatly exaggerated in these figures (e.g. the size of the "distortion" would be a much smaller proportion of the total screen area). Other aspects are shown more clearly in other figures (e.g. the trapezoidal distortion is shown more clearly in FIG. 14).

Figure 8A:
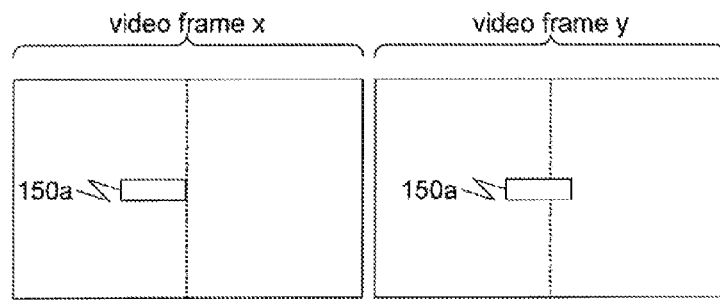
FIGS. 8A-8D are a series of graphic representations of an exemplary preferred embodiment of the present invention when the movement is rightward.
Figure 8B:
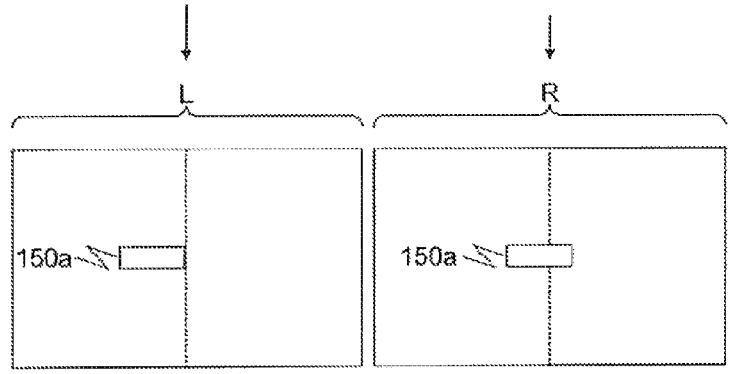
Figure 8C:
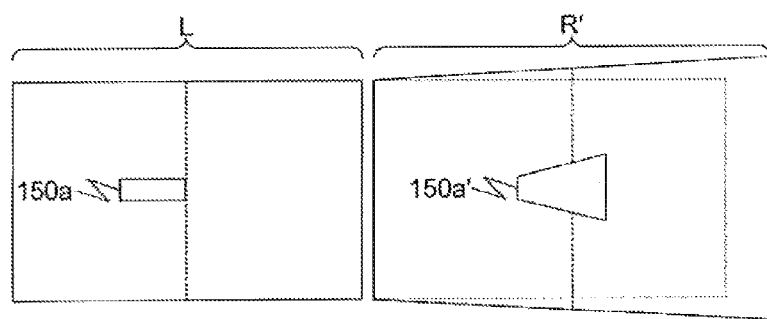
Figure 9A:
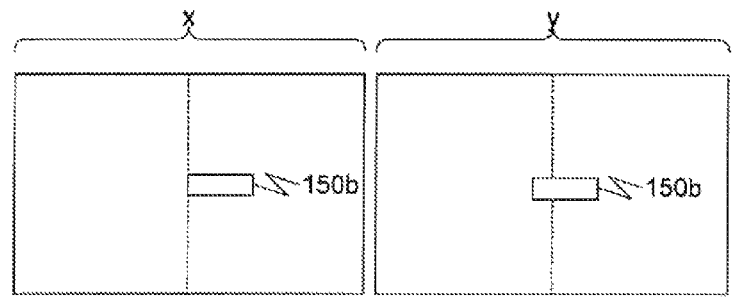
FIGS. 9A-9D are a series of graphic representations of an exemplary preferred embodiment of the present invention when the movement is leftward.
Figure 9B:
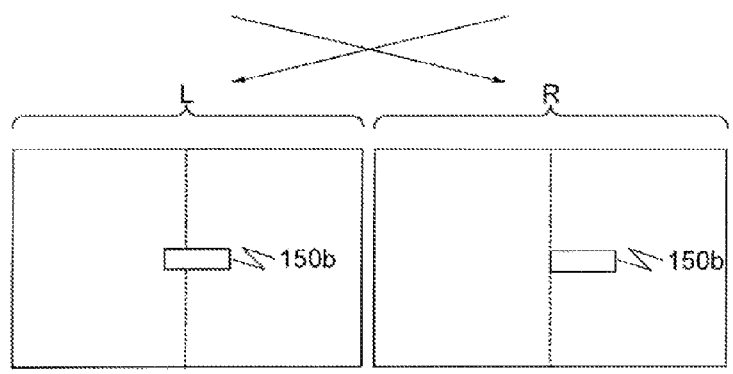

As set forth above, the second step 102 (FIG. 3) of the preferred embodiment of the exemplary process of the present invention is calculating a movement direction and movement extent based on the determined movement. This step is performed using the information obtained from step 100 (comparing at least part of video frame x to a corresponding at least part of video frame y to determine movement therebetween). Looking at FIGS. 8A and 9A, two sequential video frames (labeled as x and y) have movement in their middle areas (shown as rectangles 150a, 150b). In FIG. 8A, the movement direction of rectangle 150a is rightward in that the rectangle 150a in video frame x is in the left half of the frame and the rectangle 150a in video frame y has moved towards the right to a more central location of the frame. In FIG. 9A, the movement direction of rectangle 150b is leftward in that the rectangle 150b in video frame x is in the right half of the frame and the rectangle 150b in video frame y has moved towards the left to a more central location of the frame. Leftward or rightward would be the movement direction, For some preferred embodiments, the other directions (e.g. upward and downward) are ignored and still other directions (e.g. at an angle) are only given "credit" for their leftward and rightward components.

The movement extent is how far the movement has gone between video frame x and video frame y. The movement extents might be measured in pixels (P). Slow movements (e.g. a cloud element floating gently across a picture in a series of many frames) would move "few" pixels (P) and have small movement extents. Fast movements (e.g. a race car element speeding across a picture in a series of frames) would move "many" pixels (P) and would have large movement extents. "Few" and "many" are relative based on a predetermined number of pixels (P). This predetermined number of pixels (P) would be the "ideal" number of pixels (P) that would be needed to create a "shadow!" effect. For example, using the exemplary screen having a 1920×1080 array of pixels (P), the ideal number of pixels (P) might be between 10 and 20 pixels (P). For the purpose of discussing this invention, the predetermined number of pixels (P) will be discussed as fifteen (15) pixels (P).

Figure 10:
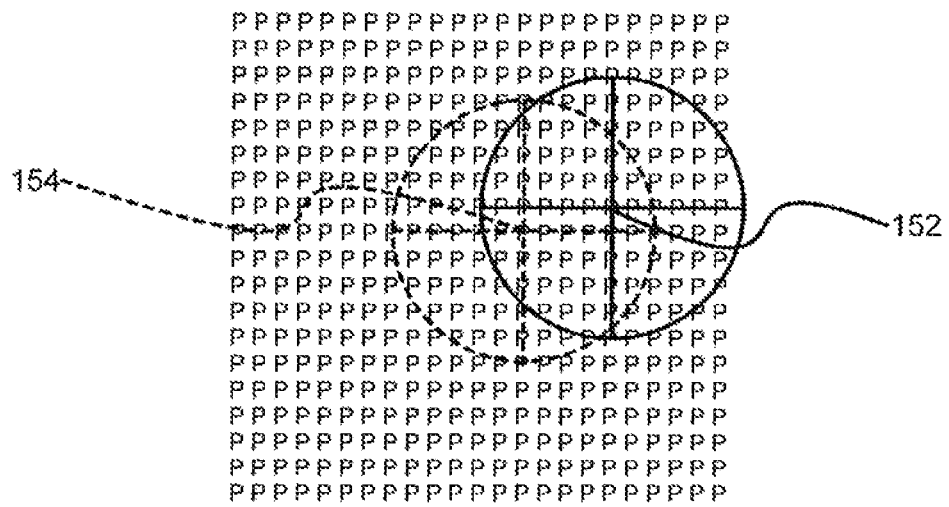
FIG. 10 is a simplified view of an array of pixels (P) with elements from two consecutive frames overlaid thereon, the elements moving a few pixels (P) between 5 the two frames.

As an example of a small movement extent, FIG. 10 shows an array of pixels (P) (that would only be a small section of the exemplary screen) with elements 152, 154 from two consecutive frames overlaid thereon. The elements 152, 154 are shown as circles with plus signs therein (element 154 is shown in phantom). Using the center of the plus signs and ignoring upward/downward movement, only a few pixels (P) (shown as four (4)) are between the elements 152, 154 of the frames. If element 152 is the first element (viewing frame x) and element 154 is the second element (viewing frame y), then the movement direction would be leftward and the movement extent would be four (4) pixels (P). If element 154 is the first element (viewing frame x) and element 152 is the second element (viewing frame y), then the movement direction would be rightward and the movement extent would still be four (4) pixels (P).

Figure 11:
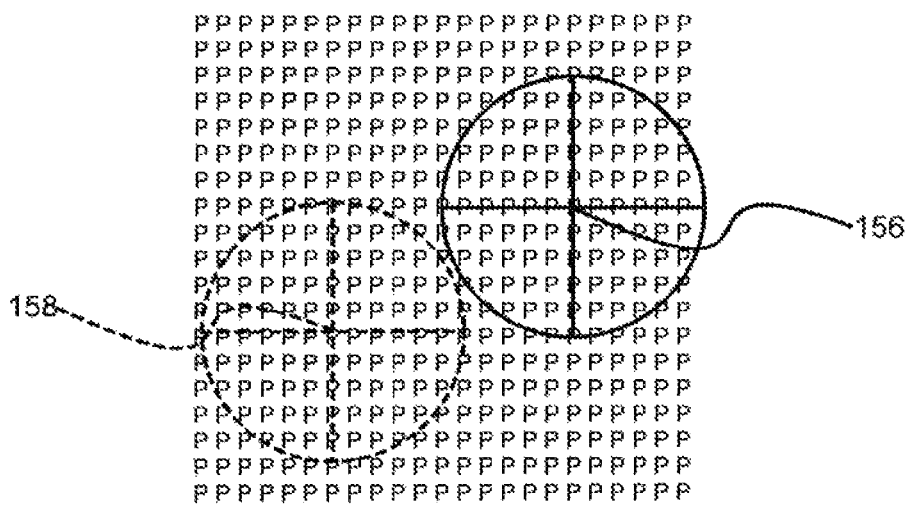
FIG. 11 is a simplified view of an array of pixels (P) with elements from two consecutive frames overlaid thereon, the elements moving many pixels (P) between the two frames.

As an example of a large movement extent, FIG. 11 shows an array of pixels (P) (that would only be a small section of the exemplary screen) with elements 156, 158 from two consecutive frames overlaid thereon. The elements 156, 158 are shown as circles with plus signs therein (element 158 is shown in phantom). Using the center of the plus signs and ignoring upward/downward movement, there are many pixels (P) (shown as eleven (11)) between the elements 156, 158 of the frames. If element 156 is the first element (viewing frame x) and element 158 is the second element (viewing frame y), then the movement direction would be leftward and the movement extent would be eleven (11) pixels (P). If element 158 is the first element (viewing frame x) and element 156 is the second element (viewing frame y), then the movement direction would be rightward and the movement extent would still be eleven (11) pixels (P).

As set forth above, the third step 104 (FIG. 3) of the preferred embodiment of the exemplary process of the present invention is determining viewing frame L and viewing frame R based on the movement direction. In preferred embodiments, if movement direction is rightward, video frame x is set to be viewing frame L and video frame y is set to be viewing frame R. This is shown as the transition between FIG. 8A and FIG. 8B. Further, in preferred embodiments, if movement direction is leftward, video frame x is set to be viewing frame R and video frame y is set to be viewing frame L. This is shown as the transition between FIG. 9A and FIG. 9B.

As set forth above, the fourth step 106 (FIG. 3) of the preferred embodiment of the exemplary process of the present invention is modifying viewing frame R based on the movement direction and the movement extent to create modified viewing frame R'. For purposes of understanding this step, in its original form, the components (X) of the picture shown in viewing frame R are evenly spaced in an array as shown in FIG. 12. The movement direction determines which direction viewing frame R is modified to create viewing frame R'. The movement extent determines how much viewing frame R is modified to create viewing frame R'.

Figure 9C:
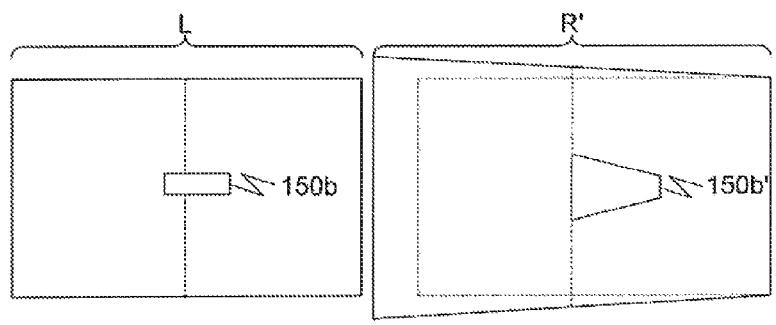

In one preferred embodiment of step 106 includes digitally "distorting" viewing frame R to create modified viewing frame R'. The movement direction determines the direction of the "distortion" of the picture shown in the frame. The term "distorting" may be any type of distortion, but is shown in the examples as elongating stretching (FIG. 13) and trapezoidal stretching (FIG. 14) (which will be discussed below). As shown by the change from the original picture (FIG. 12) to the modified viewing frame R' picture (FIG. 13) that has elongated stretched distortion, because the movement direction is rightward, the left edge is held in place and the right edge is digitally pulled. In FIG. 12, components (X) are in their original form, substantially evenly spaced. FIG. 13 shows the viewing frame distorted (elongated stretched) such that components (X) of the picture closer to the left edge would be less distorted and components (X) of the picture closer to the right side would be more distorted. It is not individual elements (such as the rectangle 150a of FIG. 8B) that are distorted, but components of the entire "picture" that are distorted (although the individual elements are distorted proportionally with the rest of the components (X) of the picture). It should be noted that if the movement direction had been leftward the right edge would have been held in place and the left edge would have been digitally pulled (elongated stretched) similar to how it is shown in FIG. 9C. How much the picture is distorted depends on the movement extent. If the movement extent is small (e.g. four (4) pixels (P)), more elongating stretching distortion is used. For example, if the "ideal" number of pixels (P) is fifteen (15), the elongating stretching distortion would be eleven (11) (which is the ideal number less the actual number). If the movement extent is large (e.g. eleven (11) pixels (P)), less elongating stretching distortion is used. For example, if the "ideal" number of pixels (P) is fifteen (15), the elongating stretching distortion would be four (4) (which is the ideal number less the actual number). If the movement extent is more than the ideal number, in preferred embodiments the viewing frame R could be displayed as modified viewing frame R' without additional distortion. Edges beyond the original frame size (shown in phantom) are preferably "cropped off" or otherwise not displayed as part of modified viewing frame R'.

Another preferred embodiment of step 106 includes digitally "distorting" viewing frame R to create trapezoidally stretched modified viewing frame R' such as that shown in FIG. 14. As shown by the change from the original picture (FIG. 12) to the modified viewing frame R' picture (FIG. 14) that has trapezoidally stretched distortion, because the movement direction is rightward, the left edge is held in place and the right edge is digitally pulled. In FIG. 12, components (X) are in their original form, substantially evenly spaced. FIG. 14 shows the viewing frame distorted (elongated stretched) such that components (X) of the picture closer to the left edge would be less distorted and components (X) of the picture closer to the right side would be more distorted. In addition, on the right side of the frame there is some vertical distortion (both up and down). In one preferred embodiment, the vertical distortion is the same as or similar to (e.g. 50% to 150%) the horizontal distortion. For example, if the horizontal distortion is 10 pixels (P) (or a length equivalent to 10 pixels (P)), there would be a 10 pixel (P) (or a length equivalent to 10 pixels (P)) vertical distortion (e.g. 5 pixels (P) up and 5 pixels (P) down). It is not individual elements (such as the rectangle 150a of FIG. 8B) that are distorted, but components of the entire "picture" that are distorted (although the individual elements are distorted proportionally with the rest of the components (X) of the picture). This can be seen to some extent in FIG. 8C in which the rectangle 150a has been distorted to a trapezoid 150a' substantially proportional to the distortion of the rest of the picture. It should be noted that if the movement direction had been leftward, the right edge would have been held in place and the left edge would have been digitally distorted as shown in FIG. 9C. How much the picture is distorted depends on the movement extent as discussed in the previous example. If the movement extent is more than the ideal number, in preferred embodiments the viewing frame R could be displayed as modified viewing frame R' without additional distortion or only with vertical distortion. Edges beyond the original frame size (shown in phantom) may be "cropped off" or otherwise not displayed as part of modified viewing frame R'.

Figure 8D:
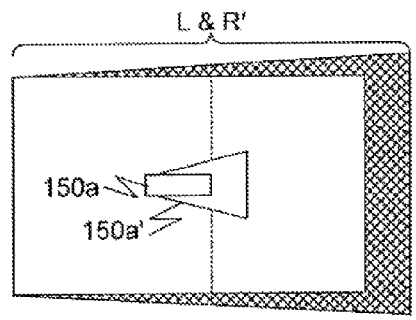
Figure 9D:
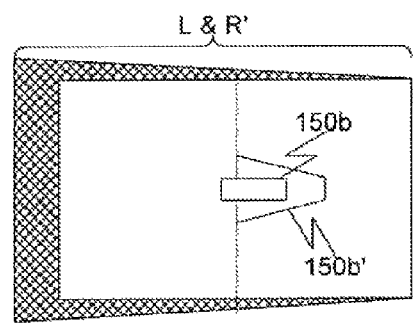

Although FIG. 8D and FIG. 9D show an unmodified viewing frame L and the primary modification discussed for modified viewing frame R', in some preferred embodiments of the present invention both viewing frame L and modified viewing frame R' may have additional modifications that enable the viewing frames to be viewable by specific eyes. For example, frame L may be modified for viewing with a user's left eye and modified frame R' may be modified for viewing with a user's right eye. This modification may be, for example, removing a first color (e.g. red) from viewing frame L and removing a second color (e.g. blue or green) from modified viewing frame R'. Another example is that this modification may be polarizing in a first direction (e.g. vertical) from viewing frame L and polarizing in a second direction (e.g. horizontal) from viewing frame R'. It should be recognized that viewing frame L and modified viewing frame R' could be modified for other technologies known and yet to be developed (e.g. those using LCD shutter glasses).

It should be noted that the step of modifying viewing frame L and modified viewing frame R' so that they are viewable by specific eyes may occur at several different points in the method of the present invention. For example, in one preferred embodiment, this modification may occur before, after, or simultaneously with step 102 (calculating a movement direction and movement extent based on the determined movement). In other preferred embodiment, this modification may occur before, after, or simultaneously with step 104 (determining viewing frame L and viewing frame R based on the movement direction). In other preferred embodiment, this modification may occur before, after, or simultaneously with step 106 (modifying viewing frame R based on the movement direction and the movement extent to create modified viewing frame R').

Preferred embodiments of the present invention preferably include a step of displaying viewing frame L for viewing by a user's left eye and modified viewing frame R' for viewing by a user's right eye. This "displaying" may occur simultaneously as discussed in connection with FIG. 4 or interleavingly as discussed in connection with FIG. 5. Alternative technologies (e.g. LCD shutter glasses) may have alternative display methods. This step of displaying may be accomplished using a projection or display device.

Another preferred embodiment of the present invention preferably includes the step of storing viewing frame L for viewing by a user's left eye and modified viewing frame R' for viewing by a user's right eye. This would effectively mean that a two-dimensional video can be converted to a three-dimensional video and then stored in memory (e.g. memory mediums, magnetic mediums, optical mediums) for later display. For example, the newly created three-dimensional video can be saved to a CD, DVD, or tape for later display.

Preferred embodiments of the method discussed herein are designed to be implemented on a video display device that includes at least one processing unit for implementing the steps discussed. Processing units include, but are not limited to CPUs (central processing unit), GPUs (graphics processing unit), math processors, and/or specially adapted processors known or yet to be developed. Multiple processing units may be used in combination. For example, a CPU may send instructions and geometry data to the GPU located on a graphics card. In one preferred embodiment, the instructions that a GPU uses are in the form of a compiled shading language program ("shader"). A shader, in the field of computer graphics, is a set of software instructions that is used primarily to calculate rendering effects on graphics hardware with a high degree of flexibility. Exemplary types of shaders are vertex shaders, pixel shaders, and geometry shaders. Shaders are able to apply transformations to a large set of elements at a time, for example, to each pixel (P) in an area of the screen, or for every vertex of a model. Shaders may be used, for example, for trapezoidal stretching or distortion and/or for applying filters (e.g. color and/or polarization).

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the term "includes" means "comprises" (e.g. a device that includes or comprises A and B contains A and B but optionally may contain C or additional components other than A and B). It should be noted that, unless otherwise specified, the singular forms "a," "an," and "the" refer to one or more than one, unless the context clearly dictates otherwise.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. A method to convert two-dimensional video to three-dimensional video, the method comprising:
    calculating a movement direction and movement extent of movement between a part of a video frame x and a part of a video frame y;
    determining a viewing frame L and viewing frame R based on the movement direction; and
    modifying the viewing frame R based on the movement direction and the movement extent to create a modified viewing frame R', wherein modifying the viewing frame R based on the movement direction includes increasing, with respect to the movement direction, spacing of components in the modified viewing frame R', wherein the components are arranged in an array to represent a picture in the modified viewing frame R' and each component represents a part of the picture.

2. The method of claim 1, further comprising comparing said part of video frame x to said part of video frame y to determine said movement.

3. The method of claim 2, wherein comparing said part of video frame x to said part of video frame y comprises performing pseudo-pattern recognition.

4. The method of claim 2, wherein comparing said part of video frame x to said part of video frame y comprises comparing a predetermined number of pixels of video frame x to a corresponding predetermined number of pixels of video frame y.

5. The method of claim 2, wherein comparing said part of video frame x to said part of video frame y comprises comparing at least one pixel at an edge of video frame x to a corresponding at least one pixel at an edge of video frame y.

6. The method of claim 2, wherein comparing said part of video frame x to said part of video frame y comprises comparing at least one pixel in a middle area of video frame x to a corresponding at least one pixel in a middle area of video frame y.

7. The method of claim 2, wherein comparing said part of video frame x to said part of video frame y comprises comparing at least one pixel at each of two or more corners of video frame x to a corresponding at least one pixel at each of two or more corners of video frame y to determine said movement.

8. The method of claim 2, wherein comparing said part of video frame x to said part of video frame y comprises:
(a) comparing at least one pixel at an edge of video frame x to a corresponding at least one pixel at an edge of video frame y;
(b) if no movement is found in (a), comparing at least one pixel in a middle area of video frame x to a corresponding at least one pixel in a middle area of video frame y; and
(c) if no movement is found in (a) and in (b), comparing at least one pixel at each of two or more corners of video frame x to a corresponding at least one pixel at each of two or more corners of video frame y.

9. The method of claim 1, wherein determining viewing frame L and viewing frame R based on said movement direction comprises:
(a) if movement direction is rightward, setting video frame x to be viewing frame L and setting video frame y to be viewing frame R; and
(b) if movement direction is leftward, setting video frame x to be viewing frame R and setting video frame y to be viewing frame L.

10. The method of claim 1, further comprising displaying viewing frame L for viewing by a user's left eye and modified viewing frame R' for viewing by a user's right eye.

11. A video display device comprising:
a processing unit; and
a memory structure having video display device-executable instructions thereon that, when executed, direct the processing unit to:
compare at least part of video frame x to a corresponding at least part of video frame y to determine movement therebetween;
calculate a movement direction and movement extent based on the determined movement, determine viewing frame L and viewing frame R based on the movement direction; and
modify viewing frame R based on the movement direction and the movement extent to create modified viewing frame R', wherein modifying the viewing frame R based on the movement direction includes increasing, with respect to the movement direction, spacing of components in the modified viewing frame R', wherein the components are arranged in an array to represent a picture in the modified viewing frame R' and each component represents a part of the picture.

12. The method of claim 1, wherein:
the movement direction is a horizontal direction; and
increasing the spacing of the components includes increasing, with respect to the movement direction, horizontal spacing between the components such that the modified viewing frame R' has elongated stretched distortion as compared to the viewing frame R.

13. The method of claim 12, further comprising increasing, with respect to the movement direction, vertical spacing between the components such that the modified viewing frame R' has trapezoidal elongated stretched distortion as compared to the viewing frame R.

14. The method of claim 1, further comprising cropping edges of the modified viewing frame R' that extend beyond an original frame size of the viewing frame R.

15. The method of claim 1, further comprising setting an amount of spacing between the components in the modified viewing frame R' based on the movement extent.

16. The video display device of claim 11, wherein:
the movement direction is a horizontal direction; and
increasing the spacing of the components includes increasing, with respect to the movement direction, horizontal spacing between the components such that the modified viewing frame R' has elongated stretched distortion as compared to the viewing frame R.

17. The video display device of claim 16, wherein increasing the spacing of the components further includes increasing, with respect to the movement direction, vertical spacing between the components such that the modified viewing frame R' has trapezoidal elongated stretched distortion as compared to the viewing frame R.

18. One or more non-transitory device-readable media storing executable instructions that, when executed, cause a system to perform operations, the operations comprising:
calculating a movement direction of movement between a part of a first video frame and a part of a second video frame;
determining a first viewing frame and a second viewing frame based on the movement direction; and
creating a third viewing frame based on the second viewing frame and the movement direction, wherein creating the third viewing frame based on the second viewing frame and the movement direction includes increasing, with respect to the movement direction, spacing of components in the third viewing frame as compared to spacing between corresponding components in the second viewing frame wherein the components are arranged in an array to represent a picture in the third viewing frame and each component represents a part of the picture.

19. The one or more non-transitory device-readable media of claim 18, wherein the operations further comprise:
calculating a movement extent of the movement between the part of the first video frame and the part of the second video frame; and
setting an amount of spacing between the components in the third viewing frame based on the movement extent.

* * * * *